United States Patent [19]
Rijkeboer et al.

[11] Patent Number: 5,869,020
[45] Date of Patent: Feb. 9, 1999

[54] PROCESS FOR THE PRODUCTION OF ALUMINUM HYDROXIDE FROM BAUXITE

[75] Inventors: Albert Rijkeboer, Arnhem; Roelof Den Hond, Leidschendam, both of Netherlands

[73] Assignee: Shell Internationale Research Maatschappij B.V., The Hague, Netherlands

[21] Appl. No.: 873,715

[22] Filed: Apr. 22, 1992

Related U.S. Application Data

[63] Continuation of Ser. No. 489,560, Mar. 7, 1990, abandoned.

[30] Foreign Application Priority Data

Mar. 21, 1989 [GB] United Kingdom ................... 8906500

[51] Int. Cl.$^6$ ........................................................ C01F 7/02
[52] U.S. Cl. ........................... 423/629; 423/625; 423/121; 423/122; 423/123
[58] Field of Search ................... 423/121, 122, 423/123, 124, 625, 629

[56] References Cited

U.S. PATENT DOCUMENTS

| | | | |
|---|---|---|---|
| 2,701,751 | 2/1955 | Porter | 423/121 |
| 2,701,752 | 2/1955 | Porter | 423/127 |
| 3,413,087 | 11/1968 | Roberts | 423/118 |
| 3,481,705 | 12/1969 | Peck et al. | 423/118 |
| 3,681,013 | 8/1972 | Fish | 423/123 |
| 3,868,442 | 2/1975 | Fish | 423/121 |
| 4,128,618 | 12/1978 | Yamada et al. | 423/121 |
| 4,324,769 | 4/1982 | McDaniel | 423/121 |
| 4,426,363 | 1/1984 | Yamada et al. | 423/121 |
| 4,446,117 | 5/1984 | McDaniel | 423/121 |
| 4,614,641 | 9/1986 | Grubbs | 423/127 |
| 4,647,439 | 3/1987 | Lepetit | 423/123 |
| 4,661,328 | 4/1987 | Grubbs | 423/121 |

FOREIGN PATENT DOCUMENTS

| | | | |
|---|---|---|---|
| 269395 | 6/1964 | Australia | 423/121 |
| 289232 | 12/1965 | Australia | 423/121 |
| 50-086499 | 11/1975 | Japan | 423/121 |

*Primary Examiner*—Ngoc-Yen Nguyen

[57] ABSTRACT

Process for the production of aluminium hydroxide by digesting bauxite with alkali solution and precipitating aluminium hydroxide from the digestion solution, comprising:

a combining bauxite and alkali solution having a caustic concentration of at least 180 grams per liter expressed as sodium carbonate and digesting partly the bauxite in the combined product in a first digestion step at relatively low temperature, b separating reaction product obtained in step a into a liquid phase and a solids/liquid slurry, c combining liquid phase and solids/liquid slurry obtained in step b and digesting the combined product in a second digestion step at relatively high temperature, d releasing heat from the reaction product obtained in step c to preheat liquid phase obtained in step b, e separating the reaction product obtained in step d into a supersaturated sodium aluminate solution and undissolved material, f precipitating aluminium hydroxide from the supersaturated sodium aluminate solution obtained in step e and separating aluminium hydroxide from the spent liquor, and recycling spent liquor obtained in step f to step a for use as alkali solution.

48 Claims, 2 Drawing Sheets

PROCESS FOR THE PRODUCTION OF ALUMINUM HYDROXIDE FROM BAUXITE

This application is a continuation of application Ser. No. 07/489,560 filed Mar. 7, 1990, now abandoned.

BACKGROUND OF THE INVENTION

The invention relates to a process for the production of aluminium hydroxide by digesting bauxite with an alkali solution and precipitating aluminium hydroxide from the digestion solution.

The most common method for the production of aluminium hydroxide from alumina-containing ores, hereafter referred to as bauxite, is the Bayer process. The aluminium hydroxide produced is usually converted into alumina intended for the electrolytical production of aluminium.

In the Bayer process bauxite is digested with an aqueous alkali solution at elevated temperature. Spent liquor, obtained after precipitating aluminium hydroxide from the digestion solution in a later stage in the Bayer process, is used as aqueous alkali solution. After the digestion step the obtained slurry, comprising a solution of alkali aluminate in which solution the constituents of the bauxite which are insoluble in the alkali solution are suspended, is cooled. Commonly flash cooling is used. The flash steam thus produced is used for (pre)heating bauxite and spent liquor before digestion. After separation and washing of the solid phase, generally referred to as red mud, the supersaturated sodium aluminate solution is further cooled and seeded with aluminium hydroxide particles to cause precipitation of aluminium hydroxide. The precipitated aluminium hydroxide is separated, washed, dried and calcined at high temperatures to form alumina. The sodium aluminate liquor with its reduced alumina content (spent liquor) is recycled to the bauxite digestion step after concentrating, if necessary, to remove water which has been introduced into the system, for example during washing the red mud and/or the precipitated aluminium hydroxide, and recharged with sodium hydroxide to make-up for sodium hydroxide losses from the circuit.

The alumina in bauxite generally exists in the form of alumina trihydrate ($Al_2O_3 \cdot 3H_2O$ or $Al(OH)_3$, gibbsite) and/or alumina monohydrate ($Al_2O_3 \cdot H_2O$ or $AlO(OH)$, boehmite, diaspore). Generally, alumina trihydrate is the main alumina component. The difference in solubility between the trihydrate and the monohydrates in aqueous alkali solutions requires different conditions in the digestion process.

Alumina monohydrate is not as easily dissolved as alumina trihydrate. A higher caustic concentration and/or a higher digestion temperature and/or a lower alumina to caustic digestion ratio is required to dissolve substantially all the alumina monohydrate from the bauxite. Usually a higher digestion temperature is used to digest the monohydrate.

The bauxite for the Bayer process is usually ground before the extraction procedure. The grinding process is often a wet grinding process in which part of the spent liquor (usually between 5 and 25 per cent) is used. The other part of the spent liquor is directly used for the digestion step.

The digestion process may be classified on the basis of the preheating procedure into a one-stream process, in which the bauxite and the aqueous alkali solution necessary for the extraction are mixed together, whereafter the mixture is subjected to preheating and extraction, and a two-stream process, in which a slurry of the bauxite in a part of the aqueous alkali solution, which slurry is usually obtained in the above-mentioned wet grinding process, and the remainder of the aqueous alkali solution are preheated individually, mixed together and then subjected to extraction.

A disadvantage of the one-stream process is the severe erosion and/or scaling which may occur during the indirect heating of the caustic bauxite slurry in indirect heat exchangers. This holds especially when the digestion step has to be carried out at relatively high temperatures because of the presence of alumina monohydrate in the bauxite feed. This problem may be solved by using steam injection in direct contact heaters. However, if the entire liquor stream is heated in this manner, excessive dilution will result.

A disadvantage of the two-stream process is the severe corrosion, which may occur in the indirect heaters used for heating the spent liquor, especially when the free caustic concentration is high and/or the temperature is high. The use in the two-stream process of indirect heat exchangers manufactured from a special material which will not be attacked by the hot alkali solution is less desirable in view of the high costs.

When bauxite containing an economically winnable amount of alumina monohydrate is used in the Bayer process, it is common practice that at least part of the digestion step is carried out at high temperature, and thus also at high pressure. Two processes are in use for extracting alumina from such bauxites. In the first process the digestion of both mono- and trihydrate is carried out under digestion conditions suitable for monohydrate-containing ores. In the second process the trihydrate is first digested from the bauxite under digestion conditions suitable for trihydrate-containing ores and the resulting residue is then treated under digestion conditions suitable for monohydrate-containing ores.

In the first process the bauxite is treated in a single digestion step at severe conditions of high temperature and high pressure suitable for digestion of the monohydrate. Consequently, the capital costs of such a plant are high.

In the second process the bauxite is first digested at conditions suitable for trihydrate extraction. In the second step the residue, which includes the monohydrate, is re-digested with a second portion of spent liquor under conditions suitable for monohydrate-containing ores.

Disadvantages of these processes are the severe erosion and/or scaling which may occur in case a one stream process is used or the severe corrosion which may occur in the case that a two-stream process is used at high temperature and/or using a high free caustic concentration.

The process of the present invention especially relates to the digestion at relatively high temperatures, usually between 210° and 270° C., of bauxite containing alumina trihydrate together with a certain amount of alumina monohydrate.

SUMMARY OF THE INVENTION

It has been found that an optimal digesting process for these bauxites is obtained when a two-stream high temperature, high pressure process is preceded by a digestion step which is carried out at atmospheric pressure or a slightly higher pressure. In this low temperature, low pressure digestion step substantially all spent liquor and substantially all bauxite are mixed, whilst only a part of the alumina trihydrate is extracted, whereafter the major part of the sodium aluminate solution is separated from a slurry comprising partly digested bauxite and a small amount of the sodium aluminate solution. Both streams or the liquor stream only are preheated individually and fed to the high temperature digester. This results in a process wherein heating to high temperatures of a spent liquor solution having a high free caustic concentration is avoided, as the liquor which has to be heated to the temperature of the high temperature digestion step has a reduced free caustic concentration because of the preceding low pressure digestion step in which the liquor is enriched with alumina.

The present invention therefore relates to a process for the production of aluminium hydroxide by digesting bauxite with alkali solution and precipitating aluminium hydroxide from the digestion solution, comprising:

a combining bauxite and alkali solution having a caustic concentration of at least 180 grams per liter expressed as sodium carbonate and digesting partly the bauxite in the combined product in a first digestion step at relatively low temperature, b separating reaction product obtained in step a into a liquid phase and a solids/liquid slurry, c combining liquid phase and solids/liquid slurry obtained in step b and digesting the combined product in a second digestion step at relatively high temperature, d releasing heat from the reaction product obtained in step c to preheat liquid phase obtained in step b, e separating the reaction product obtained in step d into a supersaturated sodium aluminate solution and undissolved material, f precipitating aluminium hydroxide from the supersaturated sodium aluminate solution obtained in step e and separating aluminium hydroxide from the liquor, and g recycling spent liquor obtained in step f to step a for use as alkali solution.

DETAILED DESCRIPTION OF THE INVENTION

Figure 1:
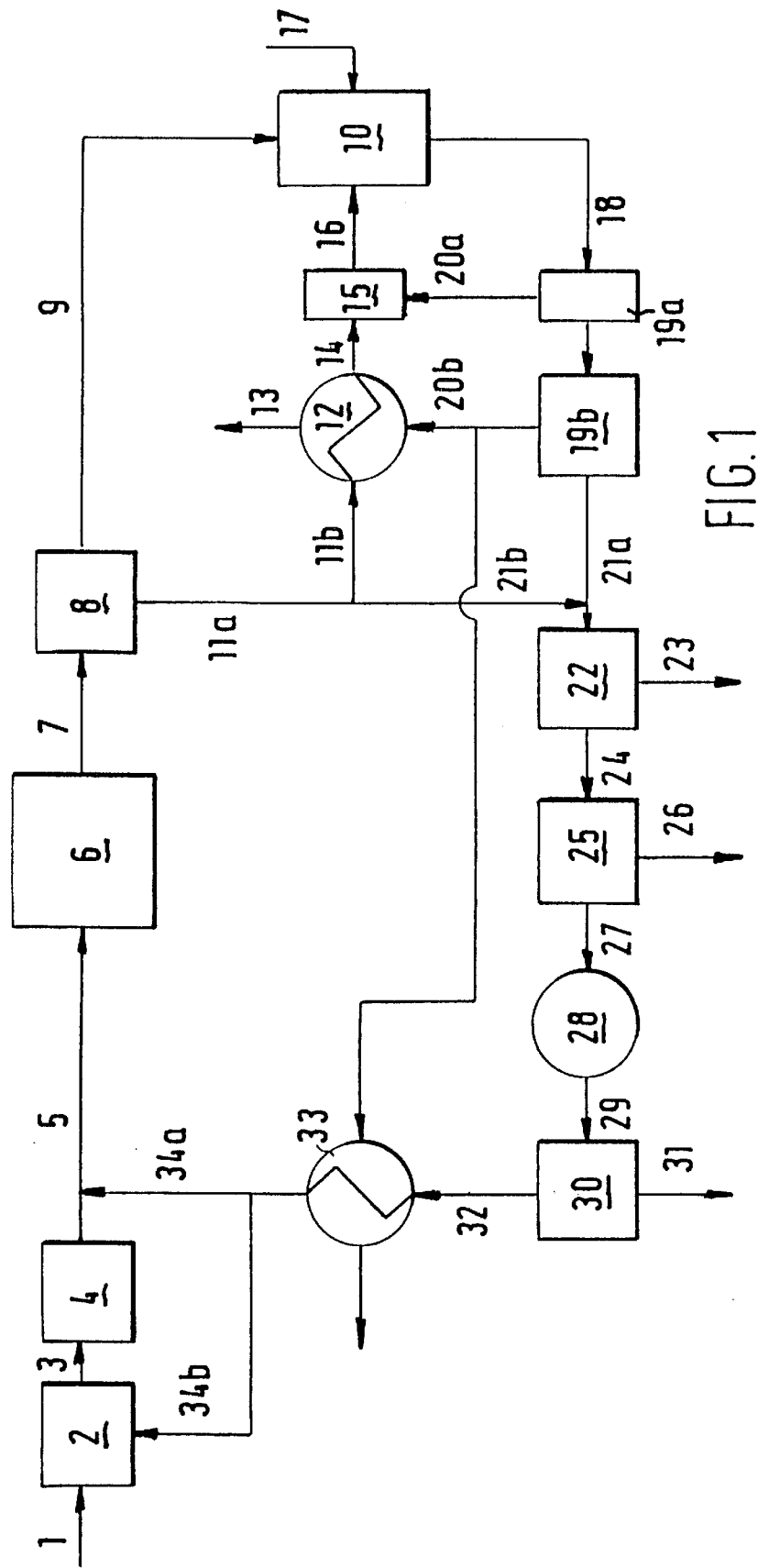
FIG. 1 is a schematic depiction of the process of the present invention.

The bauxite used for the process of the present invention suitably contains alumina trihydrate together with a certain amount of alumina monohydrate, especially between 1 and 30% by weight, preferably between 3 and 25%, more preferably between 5 and 20%, based on moisture free bauxite. The total amount of alumina in the bauxite is suitably between 30 and 75% by weight, preferably between 40 and 70%, more preferably between 50 and 65%, based on moisture free bauxite.

The bauxite to be used for the process of the present invention is preferably ground before use. The grinding process for the bauxite may be any grinding process for bauxite, but is preferably a wet grinding process. In this wet grinding process suitably a part of the spent liquor is used. The amount of spent liquor to be used in the grinding process is preferably such that a bauxite slurry between 35 and 65% by weight solids content, preferably between 40 and 60%, is obtained, which usually corresponds to between 5 and 25% of the total amount of spent liquor, typically between 10 and 20%.

In case that the bauxite contains a certain amount of reactive silica, which is often the case, it is preferred to pretreat the bauxite with a part of the spent liquor to prevent formation and deposition of silica type scales on the inside surfaces of the tanks, pipes etc. used in the process (predesilication). Scale formation on the inside heat transfer surfaces results in markedly lowered heat transfer coefficients. Several methods to prevent scale formation have been described in U.S. Pat. No. 4,647,439. During the predesilication treatment the reactive silica combines chemically with alkali and alumina present in the solution to form an insoluble, complex sodium aluminium silicate.

The predesilication treatment of a slurry of bauxite and liquor is usually carried out during 2 to 36 hours at a temperature between 50° to 105° C., preferably between 4 and 24 hours at a temperature between 65° and 95° C. The predesilication treatment is suitably carried out on the bauxite slurry discharge from the milling operation in case wet grinding of bauxite is applied. The predesilication is suitably carried out using 5 to 25% of the total liquor volume to be used in digestion, preferably 10 to 20%. In view of the autocatalytic precipitation of the desilication product the reaction time may be shorter when more reactive silica is present in the bauxite. The predesilication process is usually carried out by keeping the slurry in one or more slurry tanks during the time as indicated above at the temperature as indicated above. The predesilication treatment is especially carried out when the bauxite contains less than 5% by weight of reactive silica, more especially when the amount of reactive silica is less than 3% by weight.

The first digestion step in the process of the present invention is suitably carried out at a temperature between 80° to 155° C. during 0.005 to 4 hours. Preferably the first digestion step is carried out between 90° and 140° C. during 0.01 to 3 hours, more preferable between 95° and 125° C. during 0.02 to 2 hours. This digestion step is suitably carried out at a pressure between 0.9 and 1.4 bar, preferably between 0.95 and 1.2 bar.

The first digestion step in the process of the present invention may be carried out as a one-stream process, i.e. a process wherein the ground bauxite is mixed with the spent liquor followed by heating of the mixture to the digestion temperature, as well as a two-stream process, i.e. a process wherein the bauxite slurry and the spent liquor stream are heated separately before digestion. The first digestion step is preferably carried out in a concurrent mode of operation with respect to bauxite and liquor flow. Substantially all the bauxite partly digested in the first digestion step is usually processed in the second digestion step. Discarding a part of the bauxite, e.g. a coarse fraction, after this first digestion step would result in the loss of a part of the extractable alumina fraction.

After the first digestion step the obtained product comprises a mixture of sodium aluminate liquor and partly digested bauxite. The partly digested bauxite contains substantially all the alumina monohydrate present in the bauxite and usually part of the alumina trihydrate present in the bauxite. The alumina/caustic ratio in the liquor is usually between 0.48 and 0.70, more especially about 0.56. The obtained product is separated into a liquid phase and a solids/liquid slurry. The solids/liquid slurry contains suitably at least 20% by weight of solids, more especially at least 35%. The separation may be carried out using any solids/liquid separation means, for instance settling tanks, all kinds of filters and hydrocyclones. Preferably the separation is accomplished in one or more settling tanks using a flocculant or a combination of flocculants. The liquid phase is substantially free of solids, especially solids larger than about 100 microns. The liquid phase preferably contains less than 5 grams per liter of solids, more preferably less than 3 grams.

The liquid phase and optionally also the solids/liquid slurry are individually heated and then mixed, and subjected to the second digestion step, i.e. the high temperature digestion. The liquid phase is suitably heated by means of flash steam obtained during flash cooling of the product obtained in the high temperature digestion, preferably using indirect heat exchangers. The last heating step, however, is preferably carried out by injection of live steam. The live steam may be used for heating the liquid phase itself, and thus before introduction of the liquid phase into the high temperature digester, and/or may be used for heating the mixture of the liquid phase and the liquid/solids slurry, either just before introducing the mixture into the high temperature digester or in the high temperature digester itself. Instead of using steam for heating purposes it is also possible to use molten salts, organic liquids or a digested suspension which is still hot. The solids/liquid slurry may be heated by introducing live steam into the slurry. Part or all of the live steam necessary for heating the slurry may also be introduced after mixing with the preheated liquid phase, either just before introduction into the digester or in the digester itself. Preferably the process conditions are chosen in such a way that direct heating of above streams by injection of steam is minimized.

The combination of the liquid phase and the solids/liquid slurry may be carried out before introduction into the digester, for instance in a tube mixer, or by introduction of both streams into the digester, whereafter combination occurs in the digester itself.

The second digestion step in the process of the present invention is suitably carried out at a temperature between 140° and 320° C. during 0.01 to 3 hours. Preferably the second digestion step is carried out between 190° and 280° C. during 0.01 and 1 hour. This digestion step is suitably carried out at a pressure between 2.5 and 100 bar.

After the second digestion step the obtained product comprises a sodium aluminate liquor in which is suspended the in alkali solution insoluble part of the bauxite. The alumina trihydrate as well as the alumina monohydrate have been substantially dissolved at this stage of the process. The alumina/caustic ratio is usually between 0.62 and 0.77, especially between 0.64 and 0.72.

The slurry obtained after the second digestion step is cooled, what is commonly done by flash cooling the slurry in a plurality of flash tanks. The steam generated during the flash cooling may be used for preheating the liquid phase and/or the solids/liquid slurry which are introduced into the high temperature digester. Part of the steam may also be used for other heating purposes in the Bayer process or its auxiliary operations. Yet another part of the steam generated during flash cooling of the high temperature product, including the blow-off steam, may be used for indirect heating as well as for direct heating of the liquids and/or slurries introduced into the first digestion step. Since part of the heat required for the dissolution of alumina trihydrate is now taken up in the first digestion step at relatively low temperature instead of in high temperature digestion, that flash steam, especially the blow-off steam, that would have been lost to the atmosphere, can now be utilized in the first digestion step, thus improving the energy efficiency of the Bayer process. Instead of using steam for heat exchange purposes it is also possible to use molten salts, organic liquids or a digested suspension which is still hot.

A still further improvement of the efficiency of the process may be obtained by combining a part of the liquid phase obtained in the first digestion step with the product of the second digestion step, thus bypassing the high temperature digester. Bypassing spent liquor in a single step high temperature digestion process is sometimes done to improve the efficiency of the plant. The incorporation of the first digestion step according to the present invention allows significantly more liquor to bypass the high temperature digestion step than would be possible in case the first digestion step is omitted, since the alumina/caustic ratio of the liquid phase obtained in the first digestion step is higher than that of spent liquor. Consequently, the second digester may be smaller at constant bauxite feed rate as less liquor will flow through the digester or, alternatively, more bauxite can be processed in the second digester at constant liquor flow through the second digester.

By combination of a sodium aluminate solution with a very high alumina/caustic ratio as obtained from the high temperature digestion step with a sodium aluminate solution with a lower alumina/caustic ratio as in the bypass stream, the resulting alumina/caustic ratio will be lower than that without the bypass stream addition, thus resulting in less problems due to early crystallization of aluminium hydroxide from the supersaturated solution. Therefore, a higher efficiency is to be expected in the residue filtration step when the two streams are combined prior to this step. The two streams may suitably be combined before or after the sodium aluminate solution from the high temperature step has passed one or more precipitator tanks. By choosing the right amount of liquid phase which may bypass the high temperature digestion step, the economically most attractive way of performing the process may be found. Suitably 2 to 50% of the liquid phase is combined with the product stream from the high temperature digestion step, preferably 5 to 35%. When the bypass stream is combined with the product stream after the high temperature digestion step before residue separation, the alumina/caustic ratio of the product stream after the high temperature digestion is preferably such that after mixing with the bypassed liquid phase the alumina/caustic ratio of the mixture is between 0.62 and 0.77, especially between 0.64 and 0.72.

In case that the bauxite is a so-called low iron bauxite, bypassing part of the liquid phase around the high temperature digester has the additional advantage that the ultimate product, i.e. the alumina, shows less iron contamination than in the case that no bypass is used. This is due to the fact that during the first, low temperature digestion step hardly any iron dissolves or ends up in the liquor in colloidal form. Thus, the liquor bypassing the high temperature digestion step has a significantly lower iron concentration than the liquor from the high temperature digestion step and consequently the combination of both liquor streams results in a lower iron concentration in the liquor to the polishing filtration and subsequent alumina hydrate precipitation than in case no liquor is bypassed or the smaller tolerable flow of spent liquor is bypassed. Furthermore, the total amount of iron is sent to the high temperature digestion, but only a part of the liquor is sent to the high temperature digestion. As iron autocatalitically crystallizes from the digestion mixture, the presence of the relatively larger amount of iron in the high temperature reaction mixture results in a lower iron concentration in the sodium aluminate liquor separated from the high temperature digestion discharge, and thus to a lower iron concentration in the combined liquor sent to the polishing filtration and subsequent alumina hydrate precipitation.

The caustic concentration in the alkali solution to be used for the first digestion step, is suitably between 200 and 350 grams per liter expressed as sodium carbonate, preferably between 220 and 300 grams per liter. The free caustic concentration of the liquid phase obtained in step b is suitably between 60 and 160 grams per liter expressed as sodium carbonate, preferably between 70 and 150 grams per liter, more preferably between 75 and 140 grams per liter.

The amount of alumina which is extracted in the first digestion step of the process of the present invention is preferably between 30 and 100% by weight of the total amount of extractable alumina, preferably between 40 and 90%. In case that only a relatively low amount of alumina trihydrate is extracted, for example 30–60% by weight of the total amount of alumina trihydrate, a further improvement of the process of the present invention may be obtained by bypassing a fraction of the ground bauxite along the low temperature digestion step and routing it directly to the high temperature digestion zone. The amount of bauxite which may bypass the low temperature digestion zone is suitably between 15 and 60% of the total amount of bauxite, preferably between 20 and 50%. It will be appreciated that in the case of bypassing bauxite along the first digestion step the extraction rate of the alumina present in the bauxite which is sent to the first digestion step should be high in order to obtain approximately the same composition of the liquor after the first digestion step, thus extracting approximately the same amount of alumina as would be the case when no bauxite is bypassed.

Another improvement of the process of the present invention may be obtained by bypassing a part of the spent liquor along the first, low temperature digester. This is especially possible when a substantial amount of alumina trihydrate is digested in the first digestion step, suitably 60% or more, preferably 70–95%, thus resulting in a relatively low free caustic concentration in the liquid phase obtained in step b. Depending on the free caustic concentration which is still allowable in the heaters of the second, high temperature digestion, the liquid phase obtained in step b may be diluted with a part of the spent liquor, thus increasing the efficiency of the process. Suitably 3 to 60% of the spent liquor is bypassed, preferably 10 to 50%.

The aluminium hydroxide which is separated off in step f of the process of the present invention is usually washed, dried and calcined. Calcination is usually carried out at temperatures between 800° and 1100° C. The spent liquor obtained after the separation of the aluminium hydroxide from the liquor usually has an alumina/caustic ratio of between 0.3 and 0.4.

Still another improvement of the process of the present invention is the addition of a third digestion step. Part of the spent liquor obtained in step f is used as alkali solution in this third digestion step, which is carried out at relatively low temperature together with bauxite containing alumina trihydrate and alumina monohydrate, in which third digestion step the major part of the alumina trihydrate is extracted from the bauxite, whereafter the digestion product is separated into a liquid stream and a solids/liquid stream, which liquid stream is mixed with the reaction product obtained after step d and before step f and which solids/liquid stream is digested in the second digestion step at relatively high temperatures.

In the third digestion step the major part of the alumina trihydrate is extracted from the bauxite. Suitably at least 80% of the alumina trihydrate is extracted, preferably 90%, more preferably 96%. In the most preferred embodiment substantially all alumina trihydrate is extracted.

The bauxite to be used for this third digestion step suitably contains alumina trihydrate together with between 1 and 30% by weight of alumina monohydrate, preferably between 3 and 25%, more preferably between 5 and 20%, based on moisture free bauxite. The total amount of alumina in the bauxite is suitably between 30 and 75% by weight, preferably between 40 and 70%, more preferably between 50 and 65%, based on moisture free bauxite. Grinding and pre-desilication of the bauxite which is fed to the third digestion step may be carried out in the same way as has been described hereinbefore for the bauxite fed to the first digestion step. The amount of bauxite which is fed to the third digestion step is suitably between 20 and 200% of the amount of bauxite which is fed to the first digestion step, preferably between 30 and 180%, more preferably between 40 and 120%. The third digestion step may be carried out at the same conditions (temperature, pressure, reaction time, etc.) as have been described hereinbefore for the first digestion step.

The third digestion step in the preferred process of the present invention may be carried out as a one-stream process, as well as a two-stream process. Steam generated during flash cooling of the product obtained during high temperature digestion, including blow-off steam, may be used for indirect heating as well as for direct heating of the components to be used in the third digestion step.

After the third digestion step the obtained product comprises a mixture of sodium aluminate liquor and partly digested bauxite. The partly digested bauxite contains substantially all the alumina monohydrate present in the bauxite and possibly a small amount of alumina trihydrate. The alumina/caustic ratio in the liquor is usually between 0.62 and 0.77, especially between 0.64 and 0.72.

The obtained product is separated into a liquid stream and a solids/liquid stream. The solids/liquid stream contains suitably at least 15% by weight of solids, especially at least 20%, more especially at least 35%. The separation may be carried out using any solids/liquid separation means, for instance settling tanks, all kinds of filters and hydrocyclones. Preferably the separation is accomplished in one or more settling tanks using a flocculant or a combination of flocculants. The liquid stream is substantially free of solids, especially solids larger than about 100 microns. The liquid phase preferably contains less than 5 grams per liter of solids, more preferably less than 3 grams.

The solids/liquid stream may be subjected directly to the second digestion step which is carried out at relatively high temperature. Optionally, the solids/liquid stream may be wholly or partially added to any of the streams from step a, b and/or c.

The liquid stream is subjected to similar processing steps as the liquid stream obtained in step d. If desired, the liquid stream can be completely or partially added to any of the streams obtained after step d.

The addition of a third digestion step to the first and second digestion step will still further increase the advantages of the process with regard to iron contamination of the aluminium hydroxide which is produced for the reasons as described hereinbefore.

It is observed that the process of the present invention is especially suitable to be installed in an already existing alumina refinery based on a one stage, double stream, high temperature digestion. A potential way of improving the efficiency of such an alumina refinery is to raise the caustic concentration of the alkali solution circulating through the refinery. This will result in an improved efficiency of the plant, as the output of the plant increases in a considerable way, while capital investment and operating costs, notably energy consumption and fixed costs, only raise in a modest way and the output will be raised in a considerable way. Raising the caustic concentration, however, may result in corrosion in the digestion liquor heaters, especially when the liquor is heated to high temperature. Instalment, now, of a low temperature digester before the already existing digester according to the present invention will prevent the occurrence of corrosion also at elevated caustic concentrations of the liquor, as the free caustic concentration in the sodium aluminate liquor which has to be heated to the high digestion temperature, will decrease when passing through the low temperature digester because of the enrichment of the liquor with alumina.

A preferred embodiment of the invention is described in FIG. 1. Bauxite is fed via feedline (1) to grinding zone (2) and ground in a part of the spent liquor (supplied via pipeline (34b)). The obtained slurry is introduced via pipeline (3) into predesilication zone (4). The predesilicated bauxite slurry is mixed with the remaining part of the spent liquor (supplied via pipeline (34a)), all of the liquor having been heated with part of the flashed steam obtained from the final digestion product, and introduced via pipeline (5) into digestion zone (6). After partial digestion of the bauxite the obtained slurry is introduced via pipeline (7) into slurry settler (8), where the slurry is separated into a solids liquid slurry and a liquid phase. The solids/liquid slurry is introduced via pipeline (9) into high temperature digester zone (10). Liquid phase is introduced via pipelines (11a) and (11b) into indirect heat exchangers of the shell and tube type (12).

Flashed steam obtained from the digestion product is used for heating. Condensed steam and blow-off steam are removed via (13). The heated liquid phase is introduced via pipeline (14) into direct heater (15) for further heating using flashed steam obtained from the digestion product. The preheated liquid phase is then via pipeline (16) also introduced into high temperature digester zone (10). Live steam is introduced into the high temperature digester zone via pipeline (17). The mixture obtained after high temperature digestion, which contains the bauxite residue and liquor supersaturated in alumina, is fed via pipeline (18) into flash tanks (19a) and (19b) where it is flashed off. The obtained steam is used for heating the liquid phases as described above. The cooled mixture together with part of the liquid phase obtained from slurry settler (8) is then introduced into separating zone (22) via pipelines (21a) and (21b).

The residue is largely separated from the liquor using settling tanks, sand traps and/or cyclones and discarded via pipeline (23). The liquor is fed via pipeline (24) to filtration zone (25) where traces of red mud which are still present in the liquor are removed, whereafter the red mud is discharged via (26). The liquor is via pipeline (27) introduced into cooling zone (28), and thereafter via (29) introduced into precipitation zone (30). After seeding with alumina hydroxide crystals the aluminium hydroxide crystallizes. The aluminium hydroxide is filtrated off, washed and taken away via pipeline (31), whereafter it may be dried and calcined. The spent liquor obtained is recirculated to the first digestion step via pipeline (32), heat exchanger (33) and pipelines (34a) and (34b).

Figure 2:
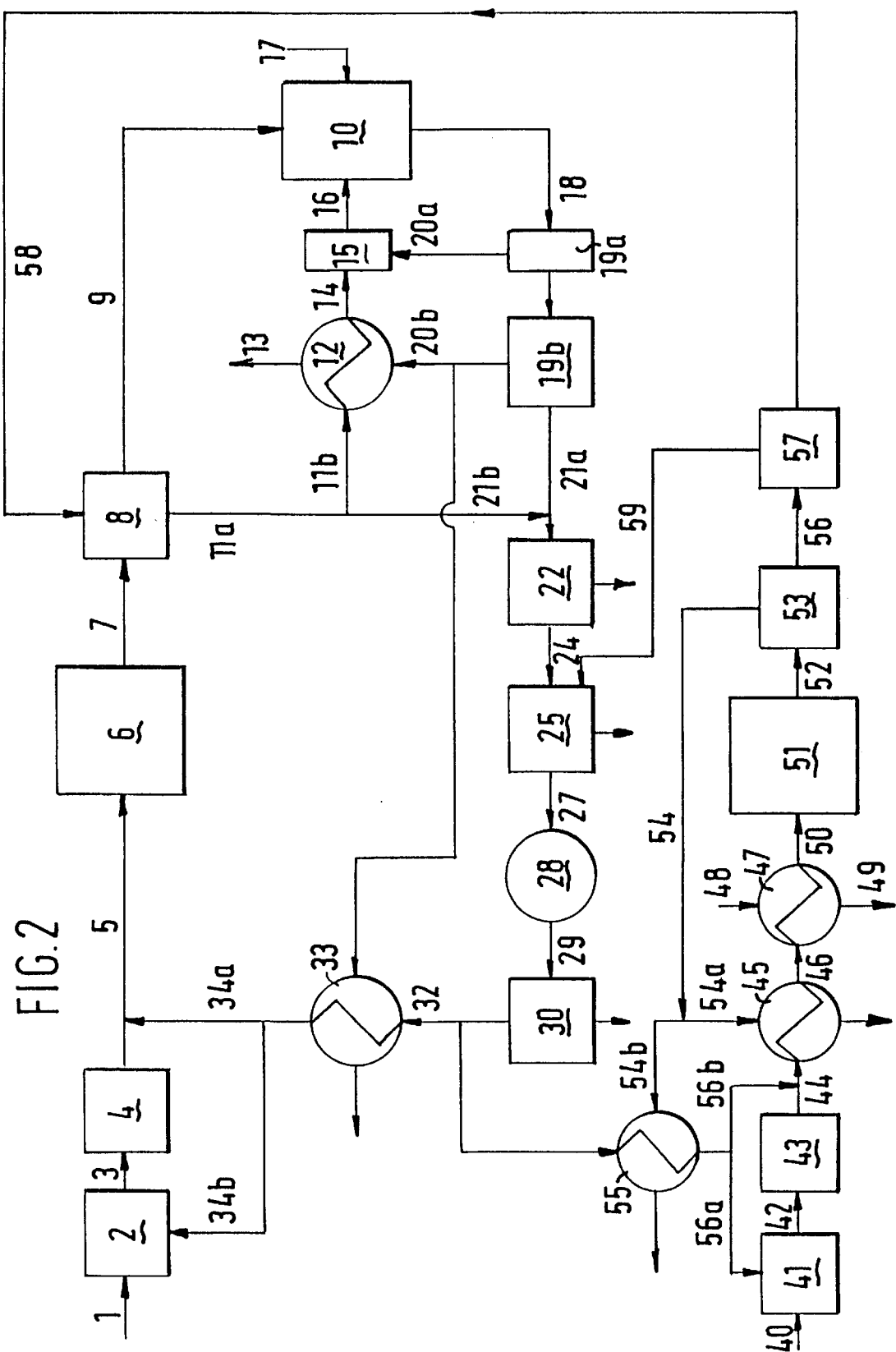
FIG. 2 is a schematic depiction of an alternative embodiment of the process of the present invention.

Another preferred embodiment of the invention is described in FIG. 2. In this figure the same process is described as in FIG. 1, together with an additional digestion process where substantially all alumina trihydrate is extracted at relatively low temperature from the bauxite, whereafter the liquor supersaturated in alumina is combined with the flashed high temperature digestion product obtained in the base scheme while the residue, comprising alumina monohydrate and red mud, is processed in the high temperature digestion step. The bauxite for the additional digestion step is fed via feedline (40) to grinding zone (41) and ground in a part of the spent liquor (supplied via pipeline (56a)). The obtained slurry is introduced via pipeline (42) into predesilication zone (43). The predesilicated bauxite slurry is mixed with another part of the spent liquor (supplied via pipeline (56b)) and introduced via pipeline (44) into indirect heat exchangers of the shell and tube type (45) using flashed steam obtained from the product of the subsequent low temperature digestion for heating. The preheated mixture is introduced via pipeline (46) into indirect heat exchangers (47) using live steam supplied from pipeline (48) for final heating. Exhaust steam is removed via (49). The heated mixture is introduced via pipeline (50) into low temperature digestion zone (51). After extraction of the alumina trihydrate the obtained slurry is introduced via pipeline (52) into flash tanks (53), where it is flashed off. The obtained steam is used for heating spent liquor and predesilicated bauxite slurry as described above via pipelines (54), (54a) and (54b) and heat exchangers (45) and (55). The cooled slurry is then introduced via pipeline (56) into slurry settler (57) where it is separated into a solids/liquid stream and a liquid stream. The solids/liquid stream is introduced via pipeline (58) into slurry settler (8), while the liquid stream is fed via pipeline (59) to filtration zone (25).

We claim:

1. A process for the production of aluminum hydroxide by digesting bauxite with alkali solution and precipitating aluminum hydroxide from the digestion solution, comprising the steps of:

(a) combining bauxite and an alkali solution having a caustic concentration of at least 180 grams per liter expressed as sodium carbonate and partially digesting the bauxite in a first digestion step at a first digestion temperature of from 80° to 155° C. to yield a first digestion product, (b) separating said first digestion product of step (a) into a liquid phase and a solid/liquid slurry, said liquid phase having a reduced free caustic concentration in relation to that of said alkali solution, and recovering said liquid phase and said solid/liquid slurry as separate streams, (c) preheating at least a portion of said liquid phase stream having said reduced free caustic concentration and combining said preheated portion of said liquid phase stream and said solid/liquid slurry stream recovered in step (b), (d) digesting the resulting admixture of step (c) comprised of said liquid phase formed in step (b) in a second digestion step at an elevated second digestion temperature higher than the first digestion temperature of step (a) of from 140° to 320° C. to yield a second digestion product, (e) cooling said second digestion product by recovering heat therefrom, said liquid phase stream being preheated in step (c) with heat recovered from said second digestion product, (f) separating the second digestion product of step (d) after being cooled in step (e) into a supersaturated sodium aluminate solution and undissolved solids material;

(g) precipitating aluminum hydroxide from the supersaturated sodium aluminate solution obtained in step (f) and separating aluminum hydroxide from the resulting spent liquor; and (h) recycling said spent liquor to step (a) for use as said alkali solution.

2. Process according to claim 1, wherein the bauxite contains alumina trihydrate together with alumina monohydrate.

3. Process according to claim 2, wherein the amount of alumina monohydrate in the bauxite is between 1 and 30% by weight.

4. Process according to claim 3, wherein the amount of alumina monohydrate in the bauxite is between 3 and 25% by weight.

5. Process according to claim 1, wherein the total amount of alumina in the bauxite is between 30 and 75% by weight.

6. Process according to claim 1, wherein the bauxite is ground before use in a wet grinding process in which part of the alkali solution to be used for the first digestion step is used.

7. Process according to claim 6, wherein the amount of alkali solution to be used for the grinding process is such that a bauxite slurry is obtained having a solids content between 35 and 65% by weight of solids.

8. Process according to claim 1, wherein the bauxite is predesilicated before the first digestion step, using part of the alkali solution to be used for the first digestion step.

9. Process according to claim 8, wherein 5 to 25% of the alkali solution to be used for the first digestion step is used for the predesilication step.

10. Process according to claim 9 in which the predesilication is carried out during 2 to 36 hours at a temperature of 50° to 105° C.

11. Process according to claim 1, wherein the first digestion step is carried out for 0.005 to 4 hours.

12. Process according to claim 11, wherein the first digestion step is carried out at a temperature between 90° and 140° C. for 0.01 to 3 hours.

13. Process according to claim 12, wherein the first digestion step is carried out at a temperature between 95° and 125° C. for 0.02 to 2 hours.

14. Process according to claim 1, wherein the first digestion step is carried out in a concurrent mode of operation with respect to bauxite and liquor flow.

15. Process according to claim 1, wherein substantially all the bauxite which has been partly digested in the first digestion step is processed in the second digestion step.

16. Process according to claim 1, wherein the solids/liquid slurry obtained in step (b) contains at least 20% by weight of solids.

17. Process according to claim 16, wherein the solids/liquid slurry contains at least 35% by weight of solids.

18. Process according to claim 1, wherein the liquid phase obtained in step (b) contains less than 5 grams per liter of solids.

19. Process according to claim 18, wherein the liquid phase contains less than 3 grams per liter of solids.

20. Process according to claim 1, wherein the second digestion step is carried out for 0.01 to 3 hours.

21. Process according to claim 20, wherein the second digestion step is carried out at a temperature of 190° to 280° C. for 0.01 to 1 hour.

22. Process according to claim 1, wherein step (e) is carried out using at least a plurality of flash tanks and indirect heat exchangers.

23. Process according to claim 22, wherein the indirect heat exchangers are shell and tube heat exchangers.

24. Process according to claim 22, wherein part of the flash steam generated in the flash tanks is used for heating the bauxite and/or the alkali solution used for the first digestion step.

25. Process according to claim 1, wherein the solids/liquid slurry obtained in step (b) is heated by introduction of live steam.

26. Process according to claim 1, wherein part of the liquid phase obtained in step (b) is combined with the product stream after the second digestion step.

27. Process according to claim 26, wherein 2 to 50% of the liquid phase is combined with the product stream after the second digestion step.

28. Process according to claim 27, wherein 5 to 35% of the liquid phase is combined with the product stream after the second digestion.

29. Process according to claim 26, wherein the part of the liquid phase which is combined with the product stream after the second digestion step, is combined with the product stream after the second digestion step before separating off undissolved material.

30. Process according to claim 1, wherein the caustic concentration in the alkali solution is between 200 and 350 grams per liter expressed as sodium carbonate.

31. Process according to claim 30, wherein the caustic concentration is between 220 and 300 grams per liter expressed as sodium carbonate.

32. Process according to claim 1, wherein the free caustic concentration of the liquid phase obtained in step (b) is between 60 and 160 grams per liter expressed as sodium carbonate.

33. Process according to claim 32, wherein the free caustic concentration of the liquid phase obtained in step (b) is between 70 and 150 grams per liter expressed as sodium carbonate.

34. Process according to claim 1, in which the amount of alumina which is extracted in the first digestion step is between 30 and 100% of the total amount of extractable alumina.

35. Process according to claim 34 in which the amount of alumina which is extracted in the first digestion step is between 40 and 90% of the total amount of extractable alumina.

36. Process according to claim 1, wherein part of the spent liquor obtained in step (g) is bypassed along the first digestion step.

37. Process according to claim 36, wherein 3 to 60% of the spent liquor is bypassed.

38. Process according to claim 1, wherein part of the bauxite is bypassed along the first digestion step.

39. Process according to claim 38, wherein 15 to 60% of the total amount of bauxite is bypassed.

40. Process according to claim 1, wherein a part of the spent liquor obtained in step (g) is used as alkali solution in a third digestion step at relatively low temperature together with bauxite containing alumina trihydrate and alumina monohydrate, in which third digestion step the major part of the alumina trihydrate is extracted from the bauxite, whereafter the digestion product is separated into a liquid stream and a solids/liquid stream, which liquid stream is mixed with the reaction product obtained after step (e) and before step (g) and which solids/liquid stream is digested in the second digestion step at elevated temperatures.

41. Process according to claim 40, wherein the total amount of alumina in the bauxite to be used in the third digestion step is between 30 and 75% by weight.

42. Process according to claim 40, wherein the amount of alumina monohydrate in the bauxite to be used in the third digestion step is between 1 and 30% by weight.

43. Process according to claim 40, herein the amount of alumina trihydrate which is extracted from the bauxite in the third digestion step is at least 80%.

44. Process according to claim 40, wherein the bauxite to be used in the third digestion step is ground before use in a wet grinding process in which part of the alkali solution to be used for the third digestion step is used.

45. Process according to claim 40, wherein the bauxite to be used in the third digestion step is predesilicated, using part of the alkali solution to be used for the third digestion step.

46. Process according to claim 40, wherein the third digestion step is carried out at a temperature of 80° to 155° C. for 0.005 to 4 hours.

47. Process according to claim 40, wherein the solids/liquid stream obtained after separation of the product stream obtained after the third digestion step contains at least 15% by weight of solids.

48. Process according to claim 1, wherein the aluminium hydroxide obtained in step (g) is converted into alumina by drying and calcination.

* * * * *